(12) United States Patent
Han et al.

(10) Patent No.: US 12,468,935 B2
(45) Date of Patent: Nov. 11, 2025

(54) METHOD AND APPARATUS WITH IMAGE CORRESPONDENCE

(71) Applicants: Samsung Electronics Co., Ltd., Suwon-si (KR); POSTECH Research and Business Development Foundation, Pohang-si (KR)

(72) Inventors: Seungju Han, Seoul (KR); Minsu Cho, Pohang-si (KR); Juhong Min, Pohang-si (KR); Jongmin Lee, Pohang-si (KR); Changbeom Park, Seoul (KR)

(73) Assignees: Samsung Electronics Co., Ltd., Suwon-si (KR); POSTECH Research and Business Development Foundation, Pohang-si (KR)

( * ) Notice: Subject to any disclaimer, the term of this patent is extended or adjusted under 35 U.S.C. 154(b) by 1191 days.

(21) Appl. No.: 17/342,858

(22) Filed: Jun. 9, 2021

(65) Prior Publication Data

US 2022/0027728 A1    Jan. 27, 2022

(30) Foreign Application Priority Data

Jul. 21, 2020  (KR) .................. 10-2020-0090560
Nov. 26, 2020  (KR) .................. 10-2020-0161385

(51) Int. Cl.
*G06N 3/08*      (2023.01)
*G06F 18/211*    (2023.01)
(Continued)

(52) U.S. Cl.
CPC .............. *G06N 3/08* (2013.01); *G06F 18/211* (2023.01); *G06F 18/25* (2023.01); *G06N 3/045* (2023.01); *G06N 3/0464* (2023.01)

(58) Field of Classification Search
CPC ........ G06N 3/08; G06N 3/045; G06N 3/0464; G06F 18/211; G06F 18/25
See application file for complete search history.

(56) References Cited

U.S. PATENT DOCUMENTS 8,600,989 B2    12/2013  Hull et al.
9,247,133 B2    1/2016   Doepke et al.
(Continued)

FOREIGN PATENT DOCUMENTS

CN    107609483 A    1/2018
CN    108337452 A    7/2018

OTHER PUBLICATIONS

Min et al., Hyperpixel Flow: Semantic Correspondence with Multi-layer Neural Features, arXiv:1908.06537v1 [cs.CV] Aug. 18, 2019; Total pp. 10 (Year: 2019).*

(Continued)

*Primary Examiner* — Alan Chen
(74) *Attorney, Agent, or Firm* — NSIP Law

(57) ABSTRACT

A method with image correspondence includes: acquiring a plurality of feature map pairs corresponding to outputs of a plurality of layers of a convolutional neural network (CNN) in response to an input of an input image pair; selecting a portion of feature map pairs from among the plurality of feature map pairs based on a feature of each of the plurality of feature map pairs; generating a hyper feature map pair based on the selected portion of feature map pairs; and generating a correspondence result of the input image pair based on a correlation of the hyper feature map pair.

26 Claims, 10 Drawing Sheets

(51) Int. Cl.
  *G06F 18/25* (2023.01)
  *G06N 3/045* (2023.01)
  *G06N 3/0464* (2023.01)

(56) References Cited

U.S. PATENT DOCUMENTS

| | | | |
|---|---|---|---|
| 10,115,032 B2 | 10/2018 | Chandraker et al. | |
| 10,380,753 B1 * | 8/2019 | Csordas | G06V 10/82 |
| 2019/0164290 A1 * | 5/2019 | Wang | G06N 3/08 |

OTHER PUBLICATIONS

Gumbel, Emil Julius. "Statistical theory of extreme values and some practical applications: a series of lectures" vol. 33. *US Government Printing Office*, 1954. (65 pages in English).
Lowe, David G. "Distinctive image features from scale-invariant keypoints." *International journal of computer vision* 60.2 (2004): 91-110. (28 pages in English).
Dalal, et al. "Histograms of oriented gradients for human detection." *2005 IEEE computer society conference on computer vision and pattern recognition (CVPR'05)*. vol. 1. Ieee, 2005. (9 pages in English).
Fei-Fei, et al. "One-shot learning of object categories." *IEEE transactions on pattern analysis and machine intelligence* 28.4 (2006): 594-611. (39 pages in English).
Liu, et al. "Sift flow: Dense correspondence across scenes and its applications." *IEEE transactions on pattern analysis and machine intelligence* 33.5 (2010): 978-994. (18 pages in English).
Rubinstein, et al. "Unsupervised joint object discovery and segmentation in internet images." *Proceedings of the IEEE conference on computer vision and pattern recognition*. 2013. (8 pages in English).
Kim, et al. "Deformable spatial pyramid matching for fast dense correspondences." *Proceedings of the IEEE Conference on Computer Vision and Pattern Recognition*. 2013. (8 pages in English).
Zeller, et al. "Visualizing and understanding convolutional networks." *European conference on computer vision*. Springer, Cham, 2014. (16 pages in English).
Long, et al. "Do convnets learn correspondence ?. " University of California Berkley (2014). (9 pages in English).
Bristow, et al. "Dense semantic correspondence where every pixel is a classifier." *Proceedings of the IEEE International Conference on Computer Vision*. 2015. (8 pages in English).
Cho, et al. "Unsupervised object discovery and localization in the wild: Part-based matching with bottom-up region proposals." *Proceedings of the IEEE conference on computer vision and pattern recognition*. 2015. (10 pages in English).
Hariharan, et al. "Hypercolumns for object segmentation and fine-grained localization." *Proceedings of the IEEE conference on computer vision and pattern recognition*. 2015. (10 pages in English).
Ham, et al. "Proposal flow." *Proceedings of the IEEE Conference on Computer Vision and Pattern Recognition*. 2016. (10 pages in English).
Taniai, et al. "Joint recovery of dense correspondence and cosegmentation in two images." *Proceedings of the IEEE conference on computer vision and pattern recognition*. 2016. (10 pages in English).
Choy, et al. "Universal correspondence network." NEC Laboratories America, Inc (2016). (17 pages in English).
Kanazawa, et al. "Warpnet: Weakly supervised matching for single-view reconstruction." *Proceedings of the IEEE Conference on Computer Vision and Pattern Recognition*. 2016. (9 pages in English).

He, et al. "Deep residual learning for image recognition." *Proceedings of the IEEE conference on computer vision and pattern recognition*. 2016. (9 pages in English).
Yang, et al. "Object-aware dense semantic correspondence." *Proceedings of the IEEE Conference on Computer Vision and Pattern Recognition*. 2017. (9 pages in English).
Ham, et al. "Proposal flow: Semantic correspondences from object proposals." *IEEE transactions on pattern analysis and machine intelligence* 40.7 (2017): 1711-1725. (15 pages in English).
Kim, et al. "Fcss: Fully convolutional self-similarity for dense semantic correspondence." *Proceedings of the IEEE conference on computer vision and pattern recognition*. 2017. (10 pages in English).
Rocco, et al. "Convolutional neural network architecture for geometric matching." *Proceedings of the IEEE conference on computer vision and pattern recognition*. 2017. (10 pages in English).
Novotny, et al. "Anchornet: A weakly supervised network to learn geometry-sensitive features for semantic matching." *Proceedings of the IEEE Conference on Computer Vision and Pattern Recognition*. 2017. (10 pages in English).
Ufer, et al. "Deep semantic feature matching." *Proceedings of the IEEE conference on computer vision and pattern recognition*. 2017. (10 pages in English).
Jang, et al. "Categorical reparameterization with gumbel-softmax." *Published as a conference paper at ICLR* (Aug. 2017). (13 pages in English).
Han, et al. "Scnet: Learning semantic correspondence." *Proceedings of the IEEE international conference on computer vision*. 2017. (10 pages in English).
Jeon, et al. "Parn: Pyramidal affine regression networks for dense semantic correspondence." *Proceedings of the European Conference on Computer Vision (ECCV)*. 2018. (16 pages in English).
Kim, et al. "Recurrent transformer networks for semantic correspondence." *Advances in neural information processing systems* 31 (2018): 6126-6136. (11 pages in English).
Rocco, et al. "End-to-end weakly-supervised semantic alignment." *Proceedings of the IEEE Conference on Computer Vision and Pattern Recognition*. 2018. (9 pages in English).
Seo, et al. "Attentive semantic alignment with offset-aware correlation kernels." *Proceedings of the European Conference on Computer Vision (ECCV)*. 2018. (16 pages in English).
Veit, et al. "Convolutional networks with adaptive inference graphs." *Proceedings of the European Conference on Computer Vision (ECCV)*. 2018. (16 pages in English).
Rocco, et al. "Neighbourhood consensus networks." $32^{nd}$ *Conference on Neural Information Processing Systems*, Montreal, Canada (Nov. 29, 2018). (20 pages in English).
Min, et al. "Hyperpixel flow: Semantic correspondence with multi-layer neural features." *Proceedings of the IEEE/CVF International Conference on Computer Vision*. 2019. (10 pages in English).
Li, et al. "Siamrpn++: Evolution of siamese visual tracking with very deep networks." *Proceedings of the IEEE/CVF Conference on Computer Vision and Pattern Recognition*. 2019. (10 pages in English).
Huang, et al. "Dynamic context correspondence network for semantic alignment." *Proceedings of the IEEE/CVF International Conference on Computer Vision*. 2019. (10 pages in English).
Lee, et al. "Sfnet: Learning object-aware semantic correspondence." *Proceedings of the IEEE/CVF Conference on Computer Vision and Pattern Recognition*. 2019. (10 pages in English).
Min, et al. "Learning to compose hypercolumns for visual correspondence." *ECCV 2020—16th European Conference on Computer Vision*. 2020. (18 pages in English).

* cited by examiner

METHOD AND APPARATUS WITH IMAGE CORRESPONDENCE

CROSS-REFERENCE TO RELATED APPLICATIONS

This application claims the benefit of Korean Patent Application No. 10-2020-0090560 filed on Jul. 21, 2020, and Korean Patent Application No. 10-2020-0161385 filed on Nov. 26, 2020, in the Korean Intellectual Property Office, the entire disclosures of which are incorporated herein by reference for all purposes.

BACKGROUND

1. Field

The following description relates to a method and apparatus with image correspondence.

2. Description of Related Art

Techniques for solving image correspondence may employ hand-crafted techniques, such as, for example, histogram of oriented gradients (HOG) and scale-invariant feature transform (SIFT). A HOG and SIFT-based feature vector may be acquired by dividing a local target area of each image based on a grid and by connecting, to a single vector, histogram bin values for gradient orientations or sizes of the respective cells of the grid. Other techniques may solve the image correspondence using a convolutional neural network (CNN). Among such techniques, some of the techniques may adopt a method of estimating a correlation between local areas of an image pair. A portion of the techniques employ a method of estimating a global transformation parameter between images by interpreting an image correspondence issue as an image alignment issue.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method with image correspondence includes: acquiring a plurality of feature map pairs corresponding to outputs of a plurality of layers of a convolutional neural network (CNN) in response to an input of an input image pair; selecting a portion of feature map pairs from among the plurality of feature map pairs based on a feature of each of the plurality of feature map pairs; generating a hyper feature map pair based on the selected portion of feature map pairs; and generating a correspondence result of the input image pair based on a correlation of the hyper feature map pair.

The plurality of layers of the CNN may include one or more intermediate layers of the CNN, and the plurality of feature map pairs may include one or more intermediate feature map pairs output from the one or more intermediate layers of the CNN.

The acquiring of the plurality of feature map pairs may include: acquiring first feature maps output from the plurality of layers of the CNN by inputting a first input image of the input image pair to the CNN; acquiring second feature maps output from the plurality of layers of the CNN by inputting a second input image of the input image pair to the CNN; and determining the plurality of feature map pairs by pairing the first feature maps and the second feature maps according to the plurality of layers of the CNN.

The selecting of the portion of feature map pairs may include dynamically selecting the portion of feature map pairs from among the plurality of feature map pairs based on outputs of one or more neural networks determined based on each of the plurality of feature map pairs.

The one or more neural networks may include: a first neural network configured to, for each of the plurality of feature map pairs, encode a channel-wise feature vectors corresponding to the feature map pair to a relevance vector; and a second neural network configured to, for each of the plurality of feature map pairs, transform the feature map pair to a low-dimensional feature map pair by reducing a channel-wise dimension of the feature map pair.

The one or more neural networks may be trained to select the portion of feature map pairs from among the plurality of feature map pairs based on a selection ratio determined by a configuration parameter.

The selecting of the portion of feature map pairs may include: determining a first feature vector corresponding to a first feature map pair among the plurality of feature map pairs; acquiring a first relevance vector corresponding to an output of a multi-layer perceptron in response to an input of the first feature vector; and determining whether to select the first feature map pair based on a value of the first relevance vector.

The selecting of the portion of feature map pairs may include selecting the portion of feature map pairs from among the plurality of feature map pairs by processing each of the plurality of feature map pairs in parallel to consider the feature of each of the plurality of feature map pairs.

The selecting of the portion of feature map pairs may include selecting the portion of feature map pairs from among the plurality of feature map pairs based on a selection ratio determined by a configuration parameter.

The configuration parameter may be determined based on either one or both of a speed and an accuracy of an application.

The generating of the hyper feature map pair may include generating the hyper feature map pair by performing upsampling and concatenation based on the selected portion of feature map pairs.

The generating of the hyper feature map pair may include generating the hyper feature map pair by combining low-dimensional feature map pairs corresponding to the selected portion of feature map pairs.

A non-transitory computer-readable record medium may store instructions that, when executed by a processor, configure the processor to perform the method.

In another general aspect, an apparatus with image correspondence includes: a processor configured to acquire a plurality of feature map pairs corresponding to outputs of a plurality of layers of a convolutional neural network (CNN) in response to an input of an input image pair, select a portion of feature map pairs from among the plurality of feature map pairs based on a feature of each of the plurality of feature map pairs, generate a hyper feature map pair based on the selected portion of feature map pairs, and generate a correspondence result of the input image pair based on a correlation of the hyper feature map pair.

The plurality of layers of the CNN may include one or more intermediate layers of the CNN, and the plurality of feature map pairs may include one or more intermediate feature map pairs output from the one or more intermediate layers of the CNN.

For the determining of the portion of feature map pairs, the processor may be configured to dynamically select the portion of feature map pairs from among the plurality of feature map pairs based on outputs of one or more neural networks determined based on each of the plurality of feature map pairs.

For the determining of the portion of feature map pairs, the processor may be configured to select the portion of feature map pairs from among the plurality of feature map pairs based on a selection ratio determined by a configuration parameter.

The apparatus may include a memory storing instructions that, when executed by the processor, configure the processor to perform the acquiring of the plurality of feature map pairs, the determining of the portion of feature map pairs, the generating of the hyper feature map pair, and the generating of the correspondence result.

The apparatus may be an electronic device including a camera configured to generate one or more input images of the input image pair.

In another general aspect, an electronic device includes: a camera configured to generate one or more input images of an input image pair; and a processor configured to acquire a plurality of feature map pairs corresponding to outputs of a plurality of layers of a convolutional neural network (CNN) in response to an input of the input image pair, select a portion of feature map pairs from among the plurality of feature map pairs based on a feature of each of the plurality of feature map pairs, generate a hyper feature map pair based on the selected portion of feature map pairs, and generate a correspondence result of the input image pair based on a correlation of the hyper feature map pair.

The plurality of layers of the CNN may include one or more intermediate layers of the CNN, and the plurality of feature map pairs may include one or more intermediate feature map pairs output from the one or more intermediate layers of the CNN.

For the determining of the portion of feature map pairs, the processor may be configured to dynamically select the portion of feature map pairs from among the plurality of feature map pairs based on outputs of one or more neural networks determined based on each of the plurality of feature map pairs.

In another general aspect, a method with image correspondence includes: determining, using one or more neural networks, relevance vectors of feature map pairs output from intermediate convolutional neural network (CNN) layers, wherein the feature map pairs are generated based on an image pair; dynamically selecting, based on the relevance vectors, a portion of the feature map pairs for generating a hyper feature map pair; and generating a correspondence result of the image pair based on a correlation of the hyper feature map pair.

The dynamically selecting may include determining whether to select or skip a feature map pair of the feature map pairs for the generating of the hyper feature map pair, based on a value of one of the relevance vectors determined for the feature map pair.

Each of the feature map pairs may be output from a different one of the intermediate CNN layers, and each of the feature map pairs include a feature map corresponding to a first image of the image pair and a feature map corresponding to a second image of the image pair.

The method may include determining a semantic correspondence between an object in a first image of the image pair and a target object in a second image of the image pair based on the correspondence result.

Other features and aspects will be apparent from the following detailed description, the drawings, and the claims.

Figure 1:
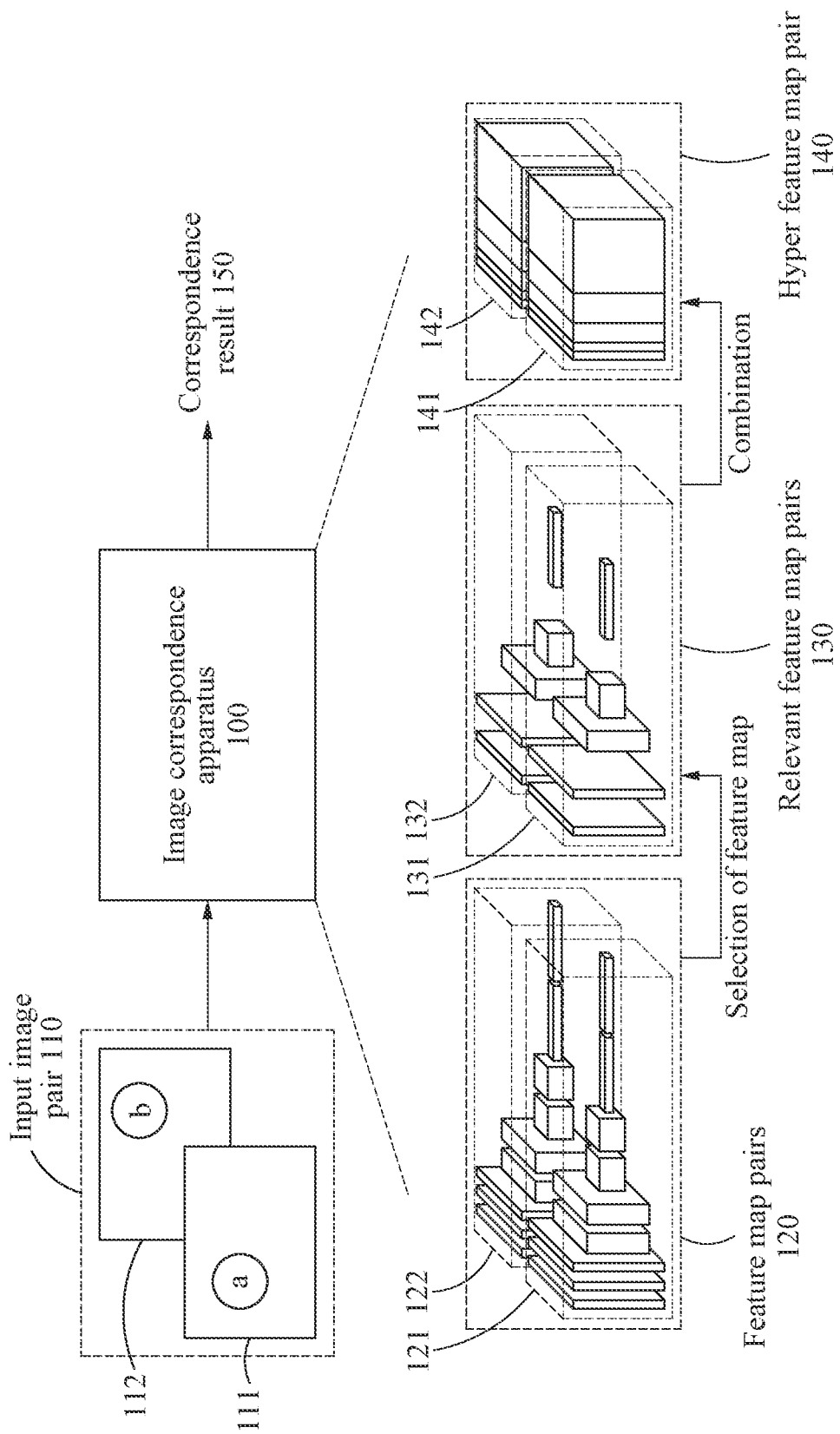
FIG. 1 illustrates an example of an overall image correspondence process for an input image pair.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions of examples disclosed in the present disclosure are merely intended for the purpose of describing the examples and the examples may be implemented in various forms. The examples are not meant to be limited, but it is intended that various modifications, equivalents, and alternatives are also covered within the scope of the claims.

The terminology used herein is for the purpose of describing particular examples only and is not to be limiting of the present disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, integers, steps, operations, elements, components, numbers, and/or combinations thereof, but do not preclude the presence or addition of one or more other features, integers, steps, operations, elements, components, numbers, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms including technical or scientific terms used herein have the same meaning as commonly understood by one of ordinary skill in the art to which this disclosure pertains after and understanding of the present disclosure. It will be further understood that terms, such as those defined in commonly-used dictionaries, should be interpreted as having a meaning that is consistent with their meaning in the context of the relevant art and the present disclosure, and will not be interpreted in an idealized or overly formal sense unless expressly so defined herein.

Also, examples will be described in detail with reference to the accompanying drawings, and like reference numerals in the drawings refer to like elements throughout and thus description will not be repeated. When it is deemed that detailed description related to the known function may make the examples unnecessarily ambiguous, the detailed description is omitted.

Although terms of "first" or "second" are used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

A component including a common function with a component included in one example is described using the same name in other examples. Unless the context clearly indicates otherwise, description made related to one example may apply to other examples and further description will be omitted.

FIG. 1 illustrates an example of an overall image correspondence process for an input image pair. Referring to FIG. 1, an image correspondence apparatus 100 may perform an image correspondence for an input image pair 110 and may output a correspondence result 150. The input image pair 110 may include a source input image 111 and a target input image 112. The correspondence result 150 may represent a correspondence relation between a source object (a) in the source input image 111 and a target object (b) in the target input image 112.

The image correspondence apparatus 100 may perform a semantic correspondence. Through the semantic image correspondence of the image correspondence apparatus 100, other types of objects in the same type of category may be matched based on a pixel unit. For example, when the source object (a) and the target object (b) correspond to different subtypes of cats or when the source object (a) and the target object (b) correspond to different types of airplanes, the correspondence result 150 may represent that the source object (a) and the target object (b) are matched. The correspondence result 150 may be used for various applications, such as, for example, object detection, object tracking, and/or object recognition.

Each of the source input image 111 and the target input image 112 may correspond to a still image that includes a single frame or may correspond to a single frame of a video that includes a plurality of frames. The source input image 111 and the target input image 112 may be the same type of images or different types of images. For example, both the source input image 111 and the target input image 112 may be still images. Alternatively, the source input image 111 may correspond to a still image and the target input image 112 may correspond to a single frame of a video. In the following, one of the source input image 111 and the target input image 112 may be referred to as a first input image and a remaining one may be referred to as a second input image.

The image correspondence may be an important factor in understanding an image as a prerequisite for a large number of applications, such as, for example, object recognition, image search, three-dimensional (3D) reconstruction, motion estimation, depth estimation, and/or motion recognition. Here, a feature representation may play an important role in the image correspondence and the image correspondence may tend to depend on or be determined using a convolutional neural network (CNN). Using neural network technology, powerful feature representation may be learned to establish a correspondence between images. Typical neural network technology may use output of the CNN as the feature representation in a learnable architecture. In general, such typical use of a CNN model may be regarded to be static in terms of using a feature of a specific layer, for example, output of a last layer and observing this regardless of a feature of an image to be matched.

In contrast, the image correspondence apparatus 100 of one or more embodiments may perform the image correspondence by dynamically selecting a layer related to the image correspondence and/or a feature output from the corresponding layer based on a feature of a given image. The image correspondence apparatus 100 may acquire feature map pairs 120 corresponding to the input image pair 110 using a CNN. For example, the image correspondence apparatus 100 may sequentially input the source input image 111 and the target input image 112 to the CNN and may sequentially acquire source feature maps 121 and target feature maps 122 corresponding to the output of the CNN. In another example, the image correspondence apparatus 100 may sequentially or parallelly input the source input image 111 and the target input image 112 to the CNN or respective CNNs and may sequentially or parallelly acquire the source feature maps 121 and the target feature maps 122 corresponding to the respective outputs of the CNN or the respective CNNs. The feature map pairs 120 may correspond to output of a plurality of layers that includes an intermediate layer (or one or more intermediate layers) of the CNN. A non-limiting example process of generating the feature map pairs 120 is further described below with reference to FIG. 2.

The image correspondence apparatus 100 may dynamically select relevant feature map pairs 130 from among the feature map pairs 120 based on a feature of each of the feature map pairs 120. For example, the relevant feature map pairs 130 may correspond to a portion of the feature map pairs 120 related to the image correspondence among the feature map pairs 120. Source relevant feature maps 131 may be selected from among the source feature maps 121 and target relevant feature maps 132 may be selected from among the target feature maps 122. The image correspondence apparatus 100 may select the relevant feature map pairs 130 from among the feature map pairs 120 using at least one neural network (e.g., another neural network in addition to the CNN). The at least one neural network may be pretrained to select the relevant feature map pairs 130 from among the feature map pairs 120 based on a feature of the input image pair 110, for example, based on a pair-wise relation between the source feature maps 121 and the target feature maps 122.

The neural network may be trained based on deep learning and may perform inference suitable for the training purpose by mapping input data and output data that are in a nonlinear relation. The deep learning refers to a machine learning scheme for outperforming an issue found in image recognition or voice recognition, as non-limiting examples, from a bigdata set. The deep learning may be understood as an optimization problem solution process of finding a point at which energy is minimized while training the neural network using prepared training data.

A weight corresponding to a model or a structure of the neural network may be acquired or determined through a supervised or unsupervised learning of the deep learning. The input data and the output data may be mapped to each other based on the weight. When a width and a depth of the neural network are sufficiently large, the neural network may have capacity enough to sufficiently implement a function. When the neural network learns a sufficiently large amount of training data through an appropriate training process, the optimal performance may be achieved.

The neural network may be represented as being trained "in advance." Here, "in advance" may represent before the neural network "starts." That the neural network "starts" may represent that the neural network is ready for inference. For example, that the neural network "starts" may include that the neural network is loaded to a memory or that input data for inference is input to the neural network after the neural network is loaded to the memory.

Referring again to FIG. 1, the image correspondence apparatus 100 may generate a hyper feature map pair 140 based on the relevant feature map pairs 130. For example, the image correspondence apparatus 100 may generate a source hyper feature map 141 by combining the source relevant feature maps 131 and may generate a target hyper feature map 142 by combining the target relevant feature maps 132. Alternatively or additionally, to reduce computational burden of a correspondence process (for example, to reduce an inference time), the image correspondence apparatus 100 may generate the hyper feature map pair 140 using a low-dimensional version of the source relevant feature maps 131 and the target relevant feature maps 132 instead of using the source relevant feature maps 131 and the target relevant feature maps 132.

A hyper feature map may represent pixels of a corresponding image as hyperpixels. The hyper feature map may also be referred to as a hyperimage. To generate a hyperimage corresponding to an image, feature maps corresponding to the image may be acquired through multiple layers of the CNN and combined through, for example, upsampling and concatenation. Here, each pixel of the image may correspond to a hyperpixel of the hyperimage. With intervention and use of the CNN, hyperpixels may provide information used to analyze a corresponding image in further detail. A one-to-one relationship or a one-to-many relationship may be established between hyperpixels of the hyperimage and pixels of the image. For example, when the hyperimage and the corresponding image have the same spatial resolution, hyperpixels and image pixels may be matched one-to-one. As another example, when the hyperimage and the corresponding image have different spatial resolutions, a one-to-many matching relationship by the difference may be established.

The image correspondence apparatus 100 may calculate a correlation between the source hyper feature map 141 and the target hyper feature map 142 and may generate the correspondence result 150. A hyperpixel corresponding to an image pixel may be represented as a vector corresponding to a spatial position of the corresponding image pixel in the hyperimage and the vector may be generated through a combination of outputs of multiple layers of the CNN. Therefore, the image correspondence apparatus 100 of one or more embodiments may more precisely perform an image correspondence process using the hyperimage. Here, the image correspondence apparatus 100 of one or more embodiments may improve an accuracy and/or a speed of the image correspondence or may balance the accuracy and the speed by using only a portion of relevant feature maps through a dynamic feature selection, instead of using all of the feature maps output from the multiple layers of the CNN.

Figure 2:
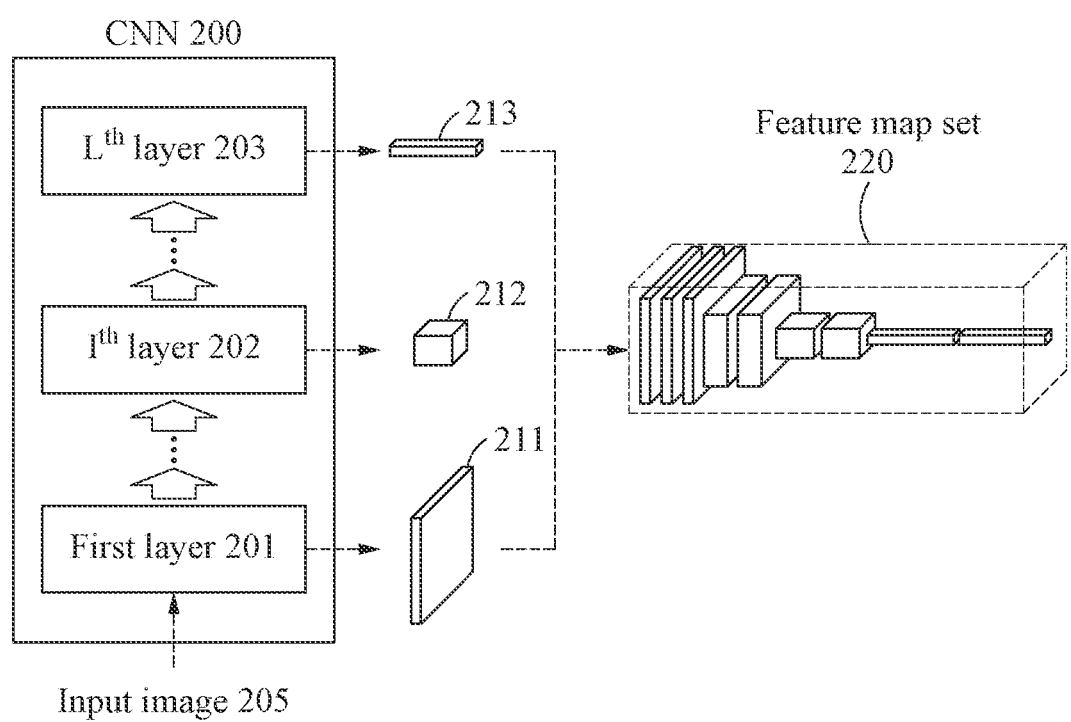
FIG. 2 illustrates an example of a process of generating feature maps.

FIG. 2 illustrates an example of a process of generating feature maps. Referring to FIG. 2, an image correspondence apparatus may generate a feature map set 220 corresponding to an input image 205 using a CNN 200. The CNN 200 may include a plurality of layers. Each layer may include a convolutional layer and a pooling layer and may be used to output a feature map to a subsequent layer. The CNN 200 may be pretrained for the purpose of feature extraction using a large training data set, such as, for example, ImageNet.

For example, the CNN 200 may include a first layer 201, an $I^{th}$ layer 202, and an $L^{th}$ layer 203. The first layer 201 may extract a feature from the input image 205 and output a first feature map 211. The $I^{th}$ layer 202 may extract a feature from an output feature map of a $(I-1)^{th}$ layer and output an $I^{th}$ feature map 212. The $L^{th}$ layer 203 may extract a feature from an output feature map of an $(L-1)^{th}$ layer and output an $L^{th}$ feature map 213. L feature maps may be output through L layers of the CNN 200. The L layers may include an intermediate layer of the CNN 200.

The L feature maps output from the CNN 200 may constitute the feature map set 220. Each of the source feature maps 121 and the target feature maps 122 of FIG. 1 may correspond to the feature map set 220. For example, the source input image 111 of the input image pair 110 of FIG. 1 may be input to the CNN 200 and the source feature maps 121 may be output from the plurality of layers of the CNN 200, and the target input image 112 of the input image pair 110 may be input to CNN 200 and the target feature maps 122 may be output from the plurality of layers of the CNN 200. The feature map pairs 120 may be determined by pairing the source feature maps 121 and the target feature maps 122 according to the plurality of layers of the CNN 200. The layers of the CNN 200 may include the intermediate layer. Therefore, the feature map pairs 120 may include an intermediate feature map pair output from the intermediate layer of the CNN 200.

Figure 3:
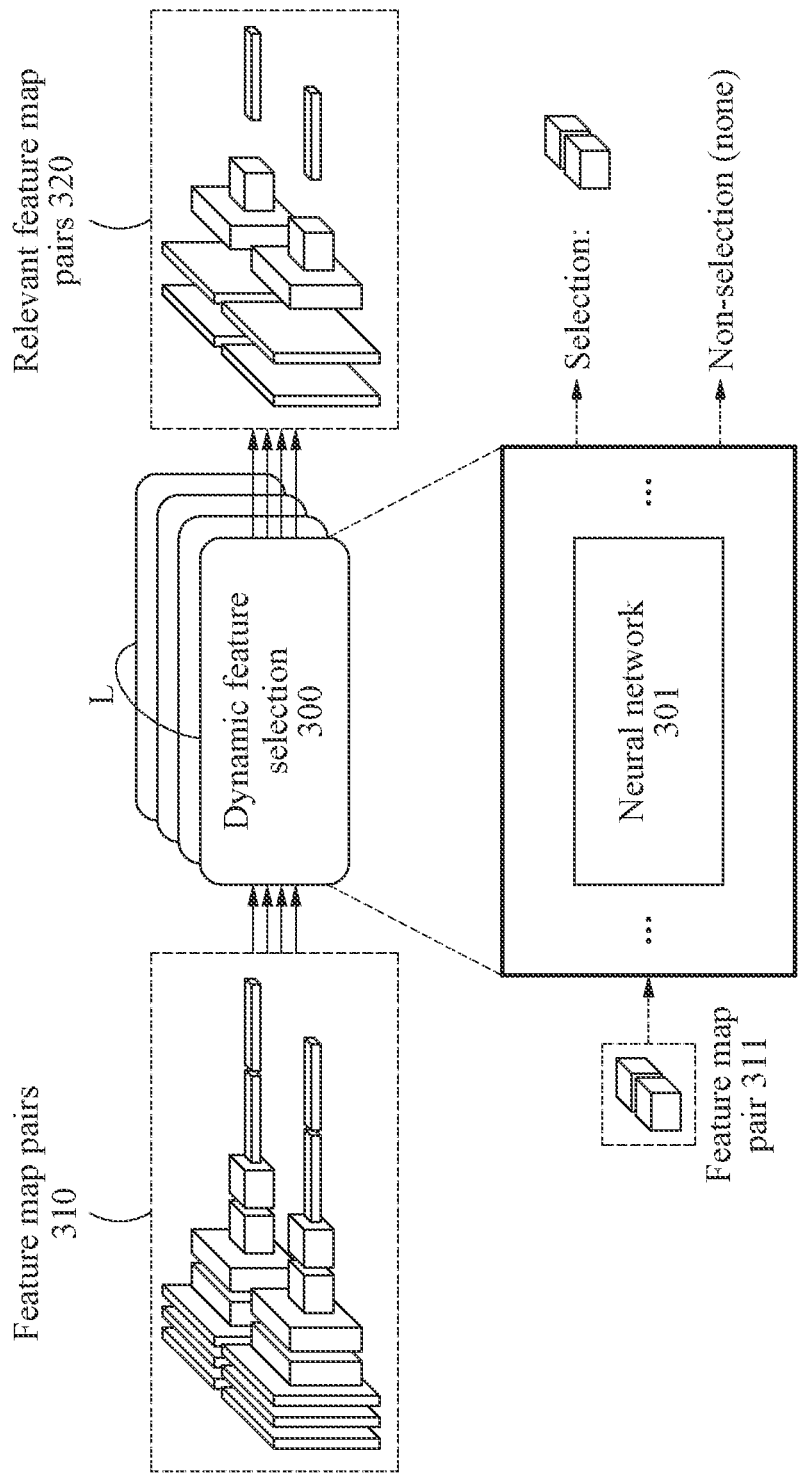
FIG. 3 illustrates an example of a dynamic feature selection operation.

FIG. 3 illustrates an example of a dynamic feature selection operation. Referring to FIG. 3, an image correspondence apparatus may select relevant feature map pairs 320 from among feature map pairs 310 through a dynamic feature selection 300.

The dynamic feature selection 300 may be performed a number of times corresponding to a number of feature map pairs included in each of the feature map pairs 310. For example, when each of the feature map pairs 310 includes L feature map pairs (e.g., output from L layers of a CNN), L dynamic feature selections 300 may be performed on the feature map pairs 310. Here, the L dynamic feature selections 300 may be sequentially performed or performed in parallel. For example, the image correspondence apparatus may select the relevant feature map pairs 320 from among the feature map pairs 310 by processing each of the feature map pairs 310 in parallel to consider a feature of each of the feature map pairs 310.

The feature map pairs 310 may include a feature map pair 311. Hereinafter, although the dynamic feature selection 300 for the feature map pair 311 among the feature map pairs 310 is representatively described, the following description may apply to remaining feature map pairs of the feature map pairs 310. The image correspondence apparatus may perform the dynamic feature selection 300 for the feature map pair 311 using a neural network 301. For example, the image correspondence apparatus may dynamically determine whether to select the feature map pair 311 based on an output of the neural network 301 about the feature map pair 311. In response to a selection on the feature map pair 311, the feature map pair 311 may be included in the relevant feature map pairs 320. In response to a non-selection on the feature map pair 311, the feature map pair 311 may not be included in (e.g., excluded from) the relevant feature map pairs 320.

The neural network 301 may output a relevance vector used to determine whether to select the feature map pair 311 based on a feature of the feature map pair 311. Here, the neural network 301 may be pretrained to output an appropriate relevance vector. For example, the neural network 301 may be pretrained through a strong map or a weak map. Non-limiting examples of training of the neural network 301 is further described below with reference to FIGS. 6 to 8.

Figure 4:
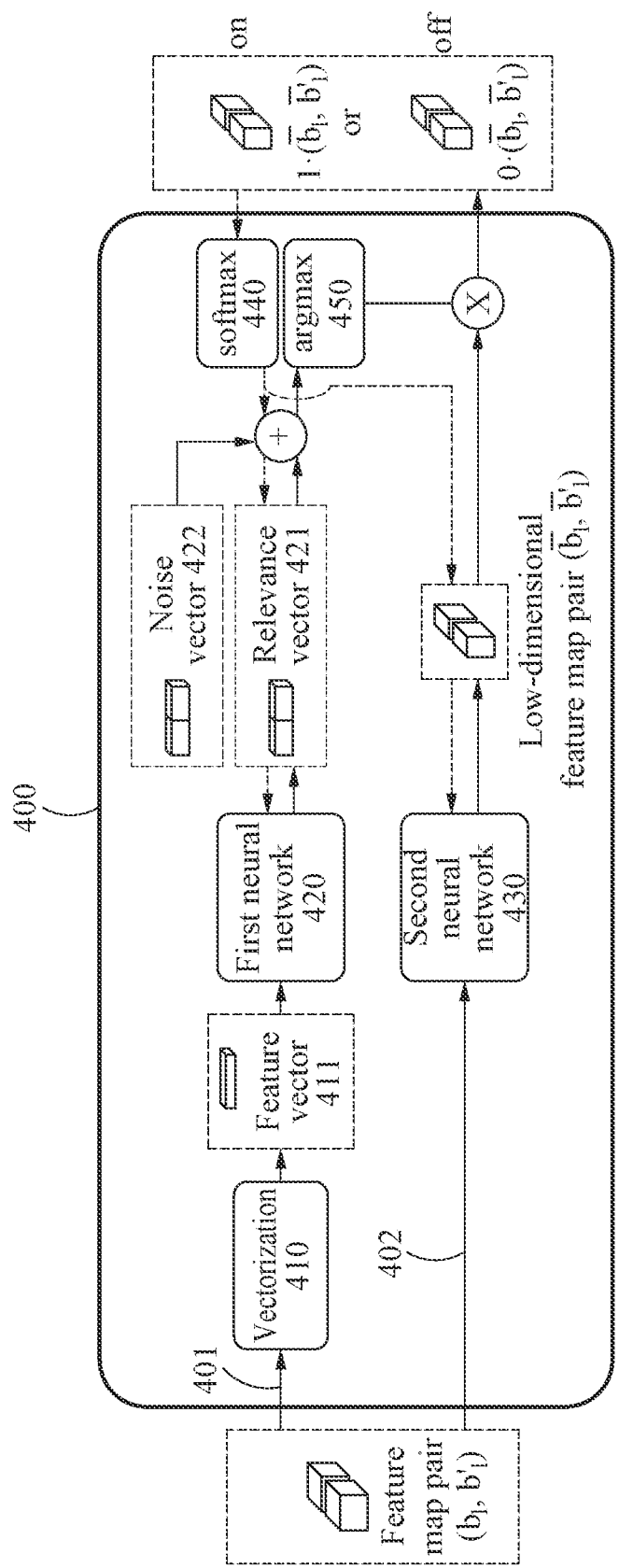
FIG. 4 illustrates an example of an inference and training process of a neural network for a dynamic feature selection.

FIG. 4 illustrates an example of an inference and training process of a neural network for a dynamic feature selection. Referring to FIG. 4, an image correspondence apparatus may determine whether to select L feature map pairs $\{(b_l, b_l')\}_{l=0}^{L-1}$ through a dynamic feature selection 400. Two feature map sets each including L feature maps extracted through a CNN are represented as B and B', respectively. Here, a single feature map pair may be represented as $(b_l, b_l')$.

The dynamic feature selection 400 may include a first branch 401 for feature selection and a second branch 402 for feature transformation. The first branch 401 may include a first neural network 420 configured to encode a channel-wise feature vector 411 corresponding to the feature map pair $(b_l, b_l')$ to a relevance vector 421. The feature selection may be performed based on the relevance vector 421. The first branch 401 may receive the feature map pair $(b_l, b_l')$ corresponding to an $l^{th}$ feature map pair as an input, perform a vectorization 410 on the feature map pair $(b_l, b_l')$, and generate the feature vector 411 corresponding to the feature map pair $(b_l, b_l')$ as a result of the vectorization 410. For example, the vectorization 410 may include a global average pooling and addition. A vector pair representing channel-wise statistics of the feature map pair $(b_l, b_l')$ may be generated through the global average pooling for the feature map pair $(b_l, b_l')$ and the feature vector 411 may be generated by performing the addition (e.g., an element-wise addition) on the respective vectors of the vector pair. A size of the feature vector 411 may be assumed as $c_l$.

The first neural network 420 may output a relevance vector 421 in response to the input of the feature vector 411. The first neural network 420 may be a multi-layer perceptron (MLP) that includes fully-connected layers. For example, the first neural network 420 may include two or more fully-connected layers. The fully-connected layers may have ReLU non-linearity. In one example, the relevance vector 421 may have a size of 2 and elements of the relevance vector 421 may represent a score for determining whether to select or skip an $l^{th}$ layer ('on' or 'off'). Although such selection may be simply determined by applying argmax 450 to the relevance vector 421, the argmax 450 may not be differentiated and such simple decision may make backpropagation difficult accordingly.

In one example, the image correspondence apparatus may use Gumbel-max trick and continuous relaxation to make the dynamic feature selection 400 more trainable and effective. A noise vector 422 may be assumed as a sequence of independent and identically distributed (iid) Gumbel-random noise and may be indicated with z. Y may represent a discrete random variable of categorical distribution u of K-class. For example, $p(Y=y) \propto u_y$, and $y \in \{0, \ldots, K-1\}$.

Therefore, sampling Y to $y=\arg\max_{k \in \{0, \ldots, K-1\}} (\log u_k + z_k)$ may be re-parameterized using Gumbel-matrix trick. To approximate the argmax 450 in a differentiable manner, the argmax 450 may be replaced with softmax 440 through continuous relaxation of the Gumbel-matrix trick. When the discrete random sample y is represented as one-hot vector y, a sample from Gumbel-softmax may be represented as $\hat{y}=\text{softmax}((\log u+z)/\tau)$. Here, τ denotes temperature of the softmax 440.

In one example, the discrete random variable may follow a Bernoulli distribution, for example, $y \in \{0, 1\}$. Also, the relevance vector 421 may represent a log probability distribution for 'on' and 'off,' for example, $\log u=r_l$. Here, $r_l$ denotes the relevance vector 421. In this case, the softmax 440 may have an output in a form represented as Equation 1 below, for example.

$$\hat{y}_l = \text{softmax}(r_l + z_l) \qquad \text{Equation 1}$$

In Equation 1, $z_l$ denotes a pair of iid Gumbel random samples. For example, softmax temperature τ may be set to 1. The re-parameterization may enable training of the first neural network 420 and a second neural network 430 through the backpropagation.

The second branch 402 may transform the feature map pair $(b_l, b_l')$ to low-dimensional feature map pair $(\bar{b}_l, \bar{b}_l')$ by reducing a channel-wise dimension through or using the second neural network 430. In one example, the second neural network 430 may perform position-wise linear transformation through 1*1 convolution. Also, a 1*1 convolutional layer may have ReLU non-linearity. The second neural network 430 may reduce a dimension of the feature map pair $(b_l, b_l')$ by 1/ρ through the 1*1 convolution. Therefore, through the second branch 402, the feature map pair $(b_l, b_l')$ with a size of $h_l \times w_l \times c_l$ may be transformed to the low-dimensional feature map pair $(\bar{b}_l, \bar{b}_l')$ with a size of $h_l \times w_l \times c_l/\rho$ as a further simplified and effective representation. In one example, when the corresponding feature map pair $(b_l, b_l')$ is determined to be skipped through the first branch 401 of the feature map pair ($b_l$, $b_l'$), transformation of the feature map pair ($b_l$, $b_l'$) through the second branch 402 may be skipped and computational cost may be reduced accordingly.

In FIG. 4, an indicator with an arrowhead indicated with a solid line represents a forward path and an indicator with an arrowhead indicated with a dotted line represents a backward path. In one example, a straight-through version of a Gumbel-softmax estimator may be used for training. The forward path may progress using discrete samples by the argmax 450 and the backward path may calculate a gradient of relaxation of the softmax of Equation 1.

In the forward path, the low-dimensional feature map pair ($\bar{b}_l$, $\bar{b}_l'$) may be multiplied by 1 ('on') or 0 ('off') based on a discrete decision y of the argmax 450. The argmax 450 may make the discrete decision y in the forward path and the continuous relaxation of the backward path may allow the gradient to be propagated through output ŷ of the softmax 440. Therefore, the first branch 401 and the second branch 402 for the relevance estimation and the feature transformation may be effectively updated regardless of the decision of the argmax 450. This probabilistic selection of one or more embodiments may increase sample diversity through random noise and may prevent mode collapse in training and may also achieve excellent performance in terms of an accuracy and a speed compared to soft gating such as using sigmoid.

Figure 5:
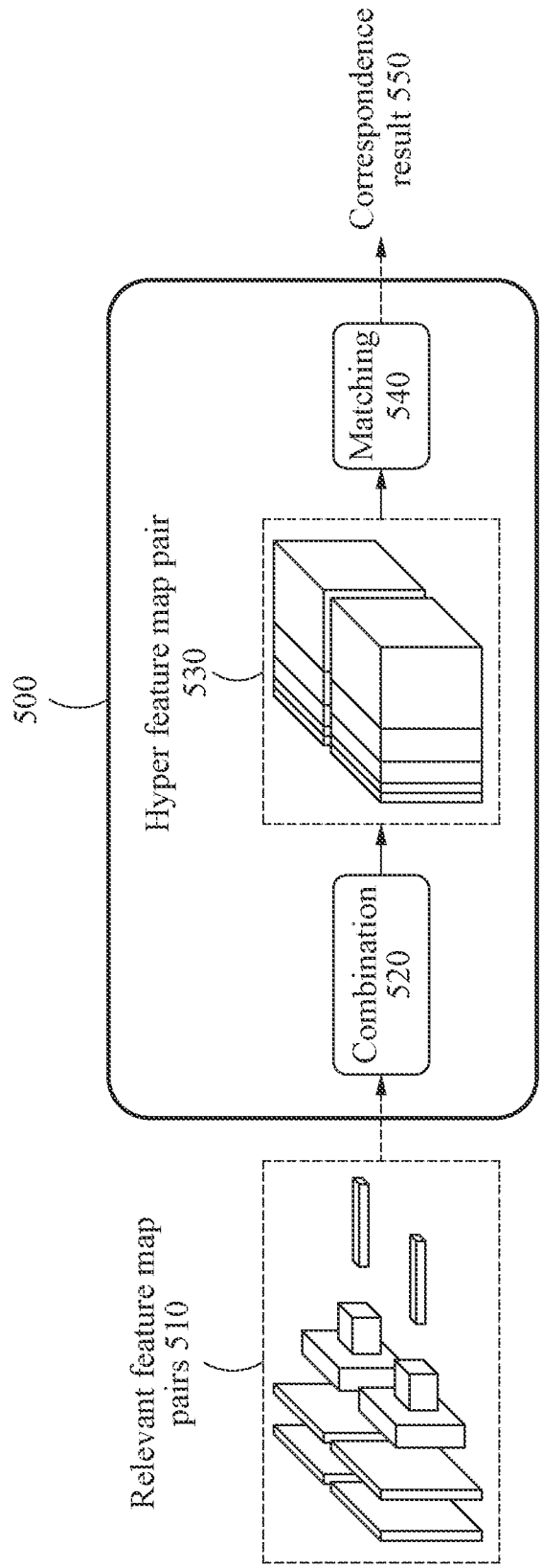
FIG. 5 illustrates an example of a generation and correspondence process of a hyper feature map.

FIG. 5 illustrates an example of a generation and correspondence process of a hyper feature map. Referring to FIG. 5, an image correspondence apparatus may generate a correspondence result 550 about an input image pair through a correlation estimation 500 based on relevant feature map pairs 510. As described above, the relevant feature map pairs 510 may be selected through a dynamic feature selection. For example, the relevant feature map pairs 510 may include the feature map pair ($b_l$, $b_l'$) or may include the low-dimensional feature map pair ($\bar{b}_l$, $\bar{b}_l'$) of FIG. 4.

The image correspondence apparatus may generate a hyper feature map pair 530 based on the relevant feature map pairs 510. For example, the image correspondence apparatus may generate the hyper feature map pair 530 through a combination 520 based on the relevant feature map pairs 510. The combination 520 may include performing either one or both of upsampling and concatenation based on the relevant feature map pairs 510. Here, the image correspondence apparatus may generate the hyper feature map pair 530 by mutually combining the feature map pair ($b_l$, $b_l'$) or by mutually combining the low-dimensional feature map pair ($\bar{b}_l$, $\bar{b}_l'$) Hereinafter, although a case of combining the low-dimensional feature map pair ($\bar{b}_l$, $\bar{b}_l'$) is described, the following description may also apply to a case of combining the feature map pair ($b_l$, $b_l'$).

Each hyper feature map of the hyper feature map pair 530 may be represented as Equation 2 below, for example.

$$[\zeta(\bar{b}_{s_1}), \zeta(\bar{b}_{s_2}), \ldots, \zeta(\bar{b}_{s_N})] \quad \text{Equation 2}$$

In Equation 2, $\zeta$ denotes a function of spatially upsampling an input feature map $\bar{b}_{s_n}$. For example, $\zeta$ may upsample the input feature map $\bar{b}_{s_n}$ based on a size of a base feature map $b_0$ or a desired ratio of an input image, for example, ¼ of the input image. $S=\{s_1, s_2, \ldots, s_N\}$ denotes a set of indices of selected features or layers. N denotes a number of selected layers. Here, N may be fully determined through the dynamic feature selection. When all of the layers are off (e.g., not selected), $S=\{0\}$ and the base feature map may be used.

The respective hyper feature maps of the hyper feature map pair 530 may be represented as H and H'. Each spatial position p of the hyper feature map may be associated with a corresponding image coordinate and a hyperpixel feature. For example, the image coordinate of the position p may be represented as $x_p$, the corresponding feature may be represented as $f_p$, and $f_p = H(x_p)$. In the hyper feature map, a hyperpixel of the position p may be defined as $h_p = (x_p, f_p)$. When a source input image and a target input image are given, two sets $\mathcal{H}$ and $\mathcal{H}'$ of hyperpixels may be acquired.

The image correspondence apparatus may determine correlation of the hyper feature map pair 530 by performing matching 540 based on the hyper feature map pair 530 and may generate the correspondence result 550 about the input image pair based on the correlation of the hyper feature map pair 530. In one example, the image correspondence apparatus may perform probabilistic Hough matching (PHM) to apply geometric consistency to the matching 540. The PHM may re-weigh the similarity of appearance through Hough space voting to reinforce the geometric consistency.

The two sets of hyperpixels may be represented as $\mathcal{D} = (\mathcal{H}, \mathcal{H}')$, elements of $\mathcal{H}$ and $\mathcal{H}'$ may be represented as h and h', and a match of h and h' may be represented as m=(h, h'). When a Hough space X representing a possible offset, that is, an image transfer, between two hyperpixels is given, reliability $p(m|\mathcal{D})$ for the match m may be calculated according to Equation 3 below, for example.

$$p(m \mid \mathcal{D}) \propto p(m_a) \sum_{x \in \chi} p(m_g \mid x) \sum_{m \in \mathcal{H} \times \mathcal{H}'} p(m_a) p(m_g \mid x) \quad \text{Equation 3}$$

In Equation 3, $p(m_a)$ denotes reliability for appearance match. $p(m_g|x)$ denotes reliability for geometric match using the offset x and may measure a level of nearness between the offset derived by m and x. By sharing the Hough space X for all matches, the PHM may efficiently calculate the match reliability with the excellent empirical performance. The reliability for appearance match may be calculated using the hyperpixel feature as represented as Equation 4 below, for example.

$$p(m_a) \propto \text{Re} \, LU\left(\frac{f_p \cdot f_p'}{\|f_p\|\|f_p'\|}\right)^2 \quad \text{Equation 4}$$

In Equation 4, the square has the effect of suppressing a decrease in the match reliability. The output of the PHM may be a correlation matrix of $|\mathcal{H}| \times |\mathcal{H}'|$ and the correlation matrix may be represented as C. In one example, soft mutual nearest neighbor filtering may be performed to suppress a noisy correlation value in the corresponding correlation matrix.

The image correspondence apparatus may set a correspondence of each hyperpixel by allocating a target hyperpixel $\hat{h}_j'$ having a highest correlation to each source hyperpixel $h_i$ based on the correlation matrix C and may generate the correspondence result 550 according to the correspondence of each hyperpixel. In many cases, ¼ of the input image using a resolution of the base feature map (e.g., ResNet-101) as a backbone is relatively high and a spatial resolution of a hyperimage is identical to a resolution of the base feature map. Therefore, hyperpixel correspondence may generate a quasi-dense match.

When a keypoint $p_m$ of the source input image is given, the image correspondence apparatus may transform $p_m$ using a nearest hyperpixel correspondence of $p_m$ and may estimate a correspondence position $\hat{p}_m'$ in the target input image. Here, all the correspondences of neighborhood hyperpixels of the keypoint $p_m$ may be collected and the geometric average of individual transformation according to each correspondence may be used for final estimation of $\hat{p}_m'$. Such statistics-based keypoint transformation may enhance mislocalized estimation that may occur in the individual transformation and may improve the accuracy.

Figure 6:
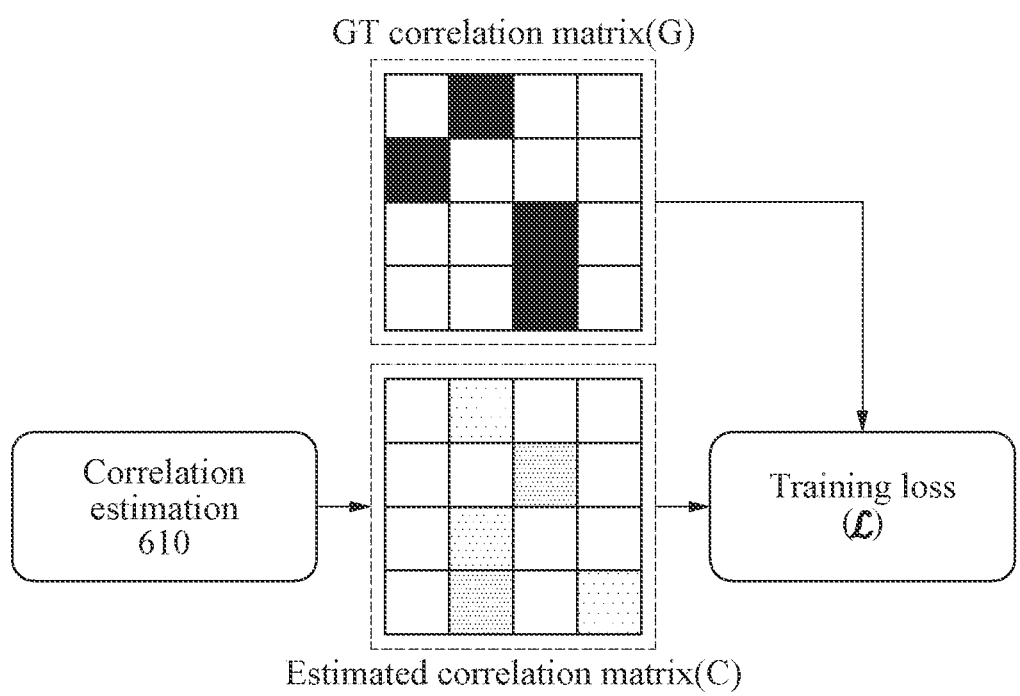
FIG. 6 illustrates an example of an overall structure for training of a neural network.

FIG. 6 illustrates an example of an overall structure for training of a neural network. Referring to 6, a correlation matrix C estimated based on a correlation estimation 610 may be generated. For example, the estimated correlation matrix C may be generated by applying row-wise softmax to an estimation result according to the correlation estimation 610. The correlation estimation 610 may correspond to the correlation estimation 500 of FIG. 5.

A training loss $\mathcal{L}$ may be calculated based on the estimated correlation matrix C and a ground-truth (GT) correlation matrix G may be calculated. A neural network for a dynamic feature selection may be trained based on the training loss $\mathcal{L}$. For example, the first neural network 420 and the second neural network 430 may be trained through the backward path.

In one example, constraints about a selection ratio according to Equation 5 below, for example, may be added to a training goal.

$$\mathcal{L}_{sel} = \sum_{l=0}^{L-1} (\bar{z}_l - \mu)^2 \qquad \text{Equation 5}$$

In Equation 5, $z_l$ denotes a portion of image pairs within a mini-batch from which an $l^{th}$ layer is selected and $\mu$ denotes a configuration parameter for the selection ratio. For example, $\mu$ may be set to 0.3, 0.5, 1.0, and the like. The neural network for the dynamic feature selection may be controlled to select relevant feature map pairs based on the selection ratio determined by the configuration parameter. For example, if $\mu=0.3$, only 30% of feature map pairs may be selected as relevant feature map pairs through the dynamic feature selection. The configuration parameter may be determined based on at least one of a speed and an accuracy required by, of, and/or determined for an application. For example, the configuration parameter may be determined based on whether priority of the application relates to a fast speed or accuracy. A layer selection loss $\mathcal{L}_{sel}$ may improve selection diversity, which may lead to improving training and balancing the speed and the accuracy.

In one example, the training loss $\mathcal{L}$ corresponding to the training goal may be defined as a combination of matching loss $\mathcal{L}_{match}$ and layer selection loss $\mathcal{L}_{sel}$ as represented as Equation 6 below, for example.

$$\mathcal{L} = \mathcal{L}_{match} + \mathcal{L}_{sel} \qquad \text{Equation 6}$$

Figure 7:
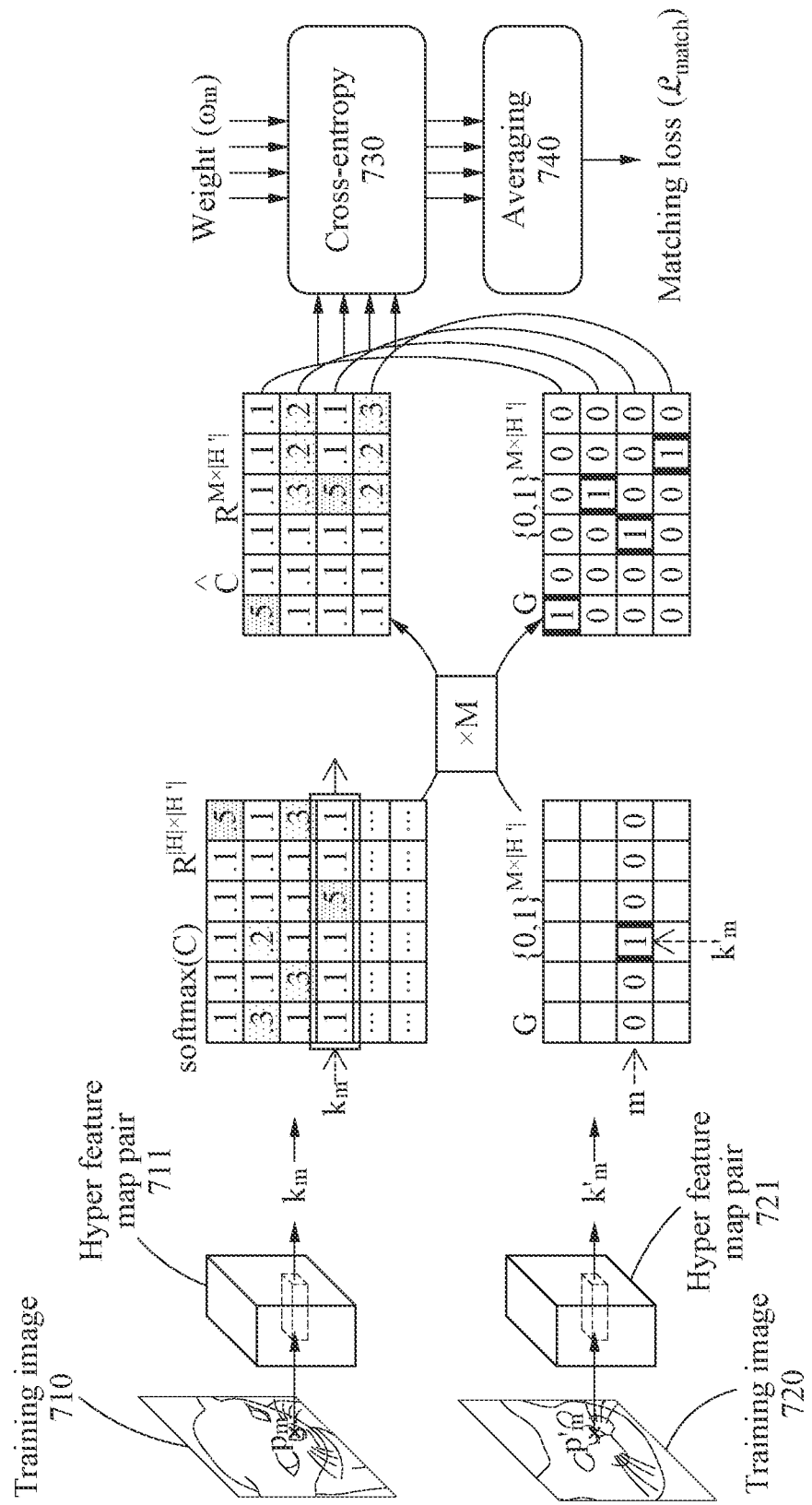
FIG. 7 illustrates an example of a training process through a strong map.
Figure 8:
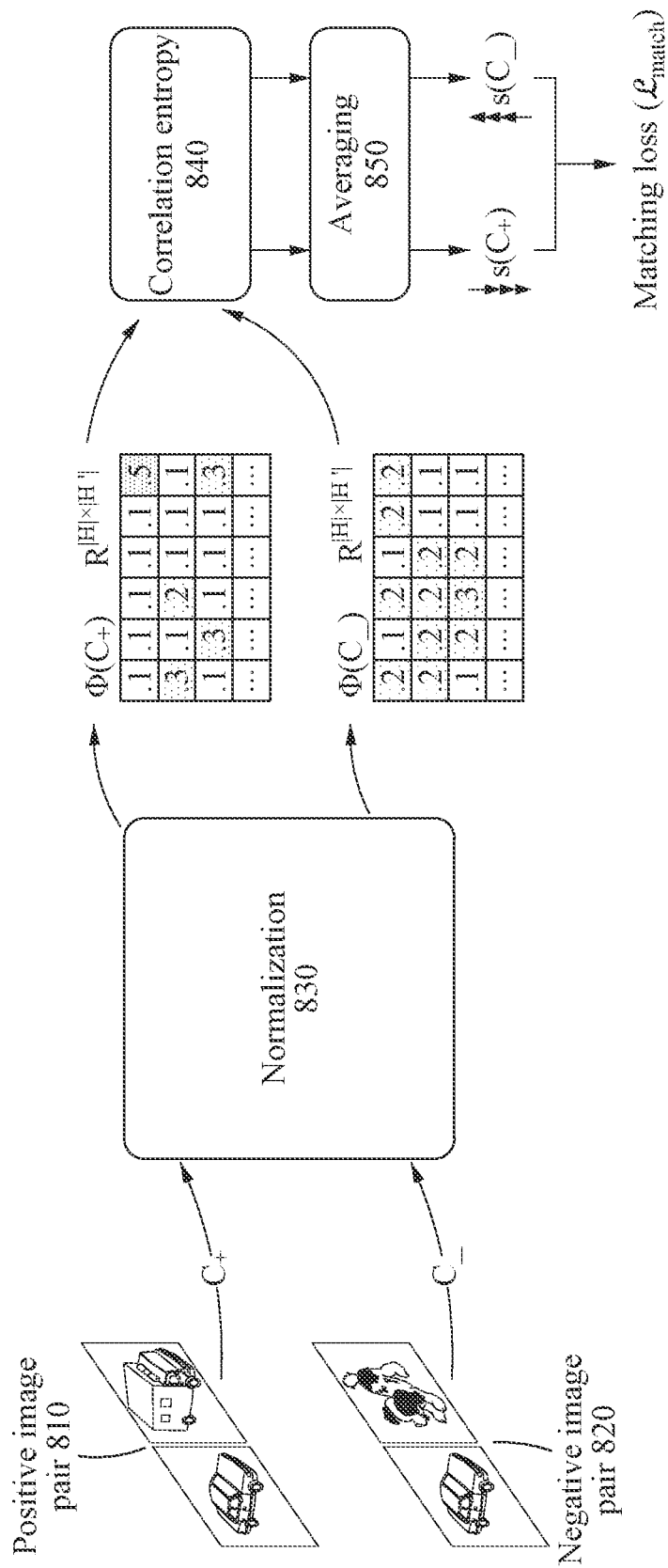
FIG. 8 illustrates an example of a training process through a weak map.

In Equation 6, the selection loss $\mathcal{L}_{sel}$ may be determined through Equation 5 and the matching loss $\mathcal{L}_{match}$ may be determined through a strong map of FIG. 7 or a weak map of FIG. 8, a non-limiting example of which is described blow.

FIG. 7 illustrates an example of a training process through a strong map. An annotation for a keypoint match of each training image pair may be provided for training according to the strong map. For example, for each image pair, a coordinate pair set according to Equation 7 below, for example, may be provided as an annotation. In Equation 7, M denotes a number of match annotations.

$$\mathcal{M} = \{(p_m, p_m')\}_{m=1}^{M} \qquad \text{Equation 7}$$

To compare an output of a neural network to a ground-truth (GT) annotation, the annotation may be transformed to a form of a discrete correlation matrix. A position index pair $(k_m, k_m')$ of a pair of hyper feature maps 711 and 721 corresponding to each coordinate pair $(p_m, p_m')$ of a pair of training images 710 and 720 may be identified or determined. When an identified match index pair set $\{(k_m, k_m')\}_{m=1}^{M}$ is given, $G \in \{0, 1\}^{M \times |\mathcal{H}'|}$ may be configured by allocating a one-hot vector representation of $k_m'$ to an $m^{th}$ row of a ground-truth matrix G. Meanwhile, $\hat{C} \in \mathbb{R}^{M \times |\mathcal{H}'|}$ may be configured by allocating a $k_m^{th}$ row of C to an $m^{th}$ row of $\hat{C}$. $\hat{C}$ may be normalized to have a mean and unit variance of 0 and softmax may be applied to each row of the matrix $\hat{C}$. FIG. 7 illustrates a configuration of $\hat{C}$ and G.

Here, a corresponding row between $\hat{C}$ and G may be compared as a categorical probability distribution. According to Equation 8 below, for example, the matching loss $\mathcal{L}_{match}$ according to the strong map may be calculated by calculating a loss of a cross-entropy 730 between $\hat{C}$ and G and by performing averaging 740 for the loss of cross-entropy 730.

$$\mathcal{L}_{match} = -\frac{1}{M} \sum_{m=1}^{M} \omega_m \sum_{j=1}^{|\mathcal{H}'|} G_{mj} \log \hat{C}_{mj} \qquad \text{Equation 8}$$

In Equation 8, $\omega_m$ denotes an importance weight for an $m^{th}$ keypoint and may be defined as Equation 9 below, for example.

$$\omega_m = \begin{cases} (\|\hat{p}_m' - p_m'\| / \delta_{thres})^2 & \text{if } \|\hat{p}_m' - p_m'\| < \delta_{thres} \\ 1 & \text{otherwise.} \end{cases} \qquad \text{Equation 9}$$

According to Equation 9, when a Euclidean distance between an estimated keypoint $\hat{p}_m'$ and a target keypoint $p_m'$ is less than a threshold distance $\delta_{thres}$, a keypoint weight $\omega_m$ may decrease the effect of a cross-entropy term and may assist training accordingly. In one example, a strong map learning may be used for self-supervised learning that uses a synthetic pair. Such self-supervised learning may offset supervisory cost for generalization performance.

FIG. 8 illustrates an example of a training process through a weak map. Dissimilar to training according to a strong map, in the case of training according to the weak map, an image level of a label may be provided for each image pair. For example, a positive label may be provided for a positive image pair 810 that includes objects of the same category and a negative label may be provided for a negative image pair 820 that includes objects of different categories. Also, a correlation matrix of the positive image pair 810 may be represented as C+ and a correlation matrix of the negative image pair 820 may be represented as C−. Here, with respect to $C \in \mathbb{R}^{|\mathcal{H}| \times |\mathcal{H}'|}$, a correlation entropy 840, s(C), may be defined as Equation 10 below, for example.

$$s(C) = -\frac{1}{|\mathcal{H}|} \sum_{i=1}^{|\mathcal{H}|} \sum_{j=1}^{|\mathcal{H}'|} \phi(C)_{ij} \log \phi(C)_{ij} \qquad \text{Equation 10}$$

In Equation 10, φ(•) corresponds to a normalization 830, such as, for example, a row-wise L1-normalization. The higher the correlation entropy 840 the less distinctive correspondence between two images. Referring to FIG. 8, a probability that a more distinctive correspondence may be included in the positive image pair 810 is high. Therefore, low entropy may be assigned to the positive entropy pair 810 and high entropy may be assigned to the negative image pair 820. Therefore, averaging 850 may be performed for the correlation entropy 840 and the matching loss $\mathcal{L}_{match}$ of the weak map may be represented as Equation 11 below, for example.

$$\mathcal{L}_{match} = \frac{s(C_+) + s(C_+^T)}{s(C_-) + s(C_-^T)} \qquad \text{Equation 11}$$

The matching loss $\mathcal{L}_{match}$ of Equation 8 or Equation 11 may be defined using a training scheme and may be used to train a neural network for a dynamic feature selection. Through such training, the neural network may configure an optimal combination of feature maps for image correspondence. Here, as represented as Equation 6, the selection loss $\mathcal{L}_{sel}$ may be further considered to define the training loss $\mathcal{L}$. Through the selection loss $\mathcal{L}_{sel}$, the computational burden may be reduced, for example, a decrease in an inference time. Depending on examples, the accuracy may increase.

Figure 9:
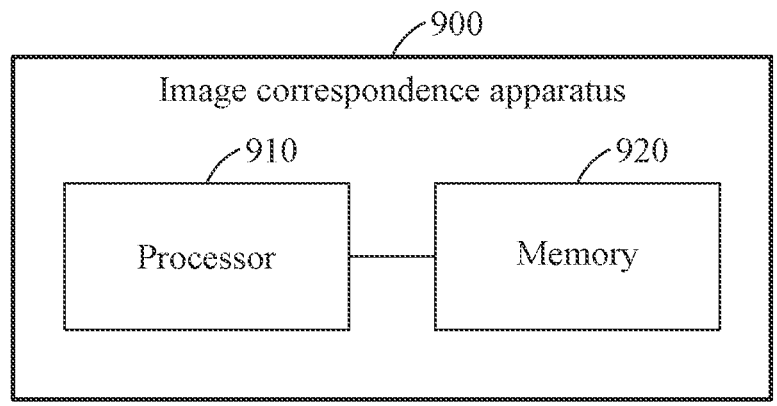
FIG. 9 illustrates an example of a configuration of an image correspondence apparatus.

FIG. 9 is a diagram illustrating an example of a configuration of an image correspondence apparatus. Referring to FIG. 9, an apparatus 900 may include a processor 910 (e.g., one or more processors) and a memory 920 (e.g., one or more memories). The apparatus 900 may be or include the image correspondence apparatus 100 of FIG. 1, according to one or more non-limiting examples. The memory 920 may connect to the processor 910 and may store instructions executable by the processor 910, data to be operated by the processor 910, or data processed by the processor 910. The memory 920 may include a non-transitory computer-readable medium, for example, a high-speed rando access memory and/or a non-volatile computer-readable storage medium, such as, for example, at least one disk storage device, flash memory device, and/or other non-volatile solid state memory devices.

The processor 910 may execute instructions to execute one or more or all operations described with reference to FIGS. 1 to 8 and FIGS. 10 and 11. The processor 910 may acquire a plurality of feature map pairs corresponding to output of a plurality of layers of a CNN in response to input of an input image pair, select a portion of feature map pairs from among the plurality of feature map pairs based on a feature of each of the plurality of feature map pairs, generate a hyper feature map pair based on the selected portion of feature map pairs, and generate a correspondence result about the input image pair based on a correlation of the hyper feature map pair.

Also, the processor 910 may perform associated operations using the correspondence result. For example, the associated operations may include various application, such as, for example, object detection, objection tracking, object recognition, image search, 3D reconstruction, motion estimation, depth estimation, and/or motion recognition. For example, in the case of object tracking, a precise correspondence calculation between a target object image and a current video frame is a key element. For motion recognition, an effective correspondence between consecutive frames is used as important motion information. Also, the examples may be widely used for the recent other tasks. For example, the examples may be used to design a model in which a 4D CNN used for the image correspondence generates an optical flow in a video frame. Therefore, the image correspondence operation disclosed herein may be widely expanded and applied to other issues and models.

Figure 10:
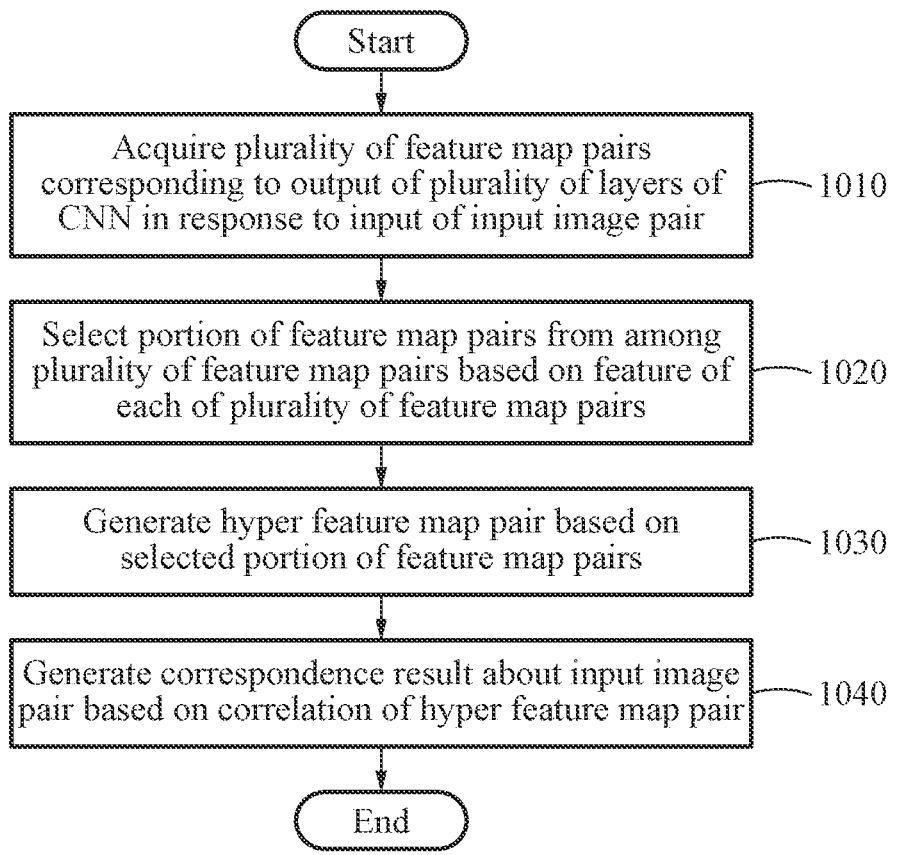
FIG. 10 illustrates an example of an image correspondence method.

FIG. 10 illustrates an example of an image correspondence method. Referring to FIG. 10, an image correspondence apparatus may acquire a plurality of feature map pairs corresponding to output of a plurality of layers of a CNN in response to input of an input image pair in operation 1010, select a portion of feature map pairs from among the plurality of feature map pairs based on a feature of each of the plurality of feature map pairs in operation 1020, generate a hyper feature map pair based on the selected portion of feature map pairs in operation 1030, and generate a correspondence result about the input image pair based on a correlation of the hyper feature map pair in operation 1040. Description related to FIGS. 1 to 9 and FIG. 11 may apply to the image correspondence method of FIG. 10.

Figure 11:
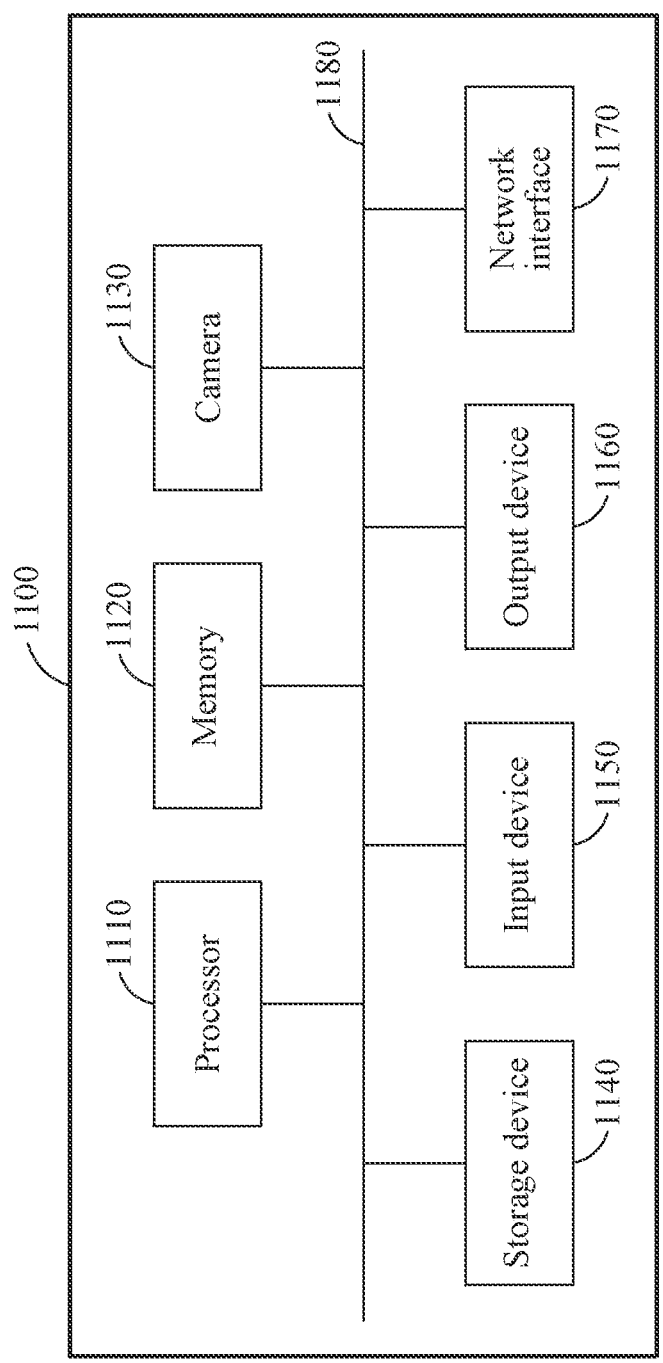
FIG. 11 illustrates an example of an electronic device related to an image correspondence apparatus.

FIG. 11 is a diagram illustrating an example of a configuration of an electronic device related to an image correspondence apparatus. Referring to FIG. 11, an electronic device 1100 may acquire an input image and may perform a visual correspondence on the acquired input image. Also, the electronic device 1100 may performed associated operations using the linked result. For example, the associated operations may include various applications, such as object detection, object tracking, object recognition, image search, 3D reconstruction, motion estimation, depth estimation, and motion recognition. The electronic device 1100 may structurally and/or functionally include the image correspondence apparatus 100 of FIG. 1. The electronic device 1100 may be or include the image correspondence apparatus 100 of FIG. 1, according to one or more non-limiting examples.

Referring to FIG. 11, the electronic device 1100 may include a processor 1110 (e.g., one or more processors), a memory 1120 (e.g., one or more memories), a camera 1130, a storage device 1140, an input device 1150, an output device 1160, and a network interface 1170. The components of the electronic device 1100 may communicate with each other through a communication bus 1180. For example, the electronic device 1100 may be implemented as at least a portion of a mobile device such as a mobile phone, a smartphone, a PDA, a netbook, a tablet PC, and a laptop computer, a wearable device such as a smart watch, a smart band, and a smart glass, a computing device such as a desktop and a server, an electronic home appliance such as a TV, a smart TV, and a refrigerator, a security device such as a door lock, and/or a vehicle such as a smart vehicle.

The processor 1110 may execute functions and instructions to be executed in the electronic device 1100. For example, the processor 1110 may process instructions stored in the memory 1120 and/or the storage device 1140. The processor 1110 may perform at least one operation described above with reference to FIGS. 1 to 10.

The memory 1120 may store data for image correspondence. The memory 1120 may include a computer-readable storage medium or a computer-readable storage device. The memory 1120 may store instructions to be executed by the processor 1110 and may store related information during execution of software and/or an application by the electronic device 1100.

The camera 1130 may capture a photo and/or a video. In one example, the camera 1130 may generate at least one input image of an input image pair. Here, the image generated by the camera 1130 may be used as a target image. For example, a sequence of target images may be generated through the camera 1130 and a corresponding point representing a corresponding object, for example, an object of the same category, of a source object in a given source image may be detected from each target image of the sequence. Such generation of the sequence and detection of the correspondence point may be performed in real time.

The storage device 1140 may include a computer-readable storage medium or a computer-readable storage device. In one example, the storage device 1140 may store a larger amount of information than the memory 1120 and may store the information for a long term. For example, the storage device 1140 may include a magnetic hard disk, an optical disc, a flash memory, a floppy disk, or other types of non-volatile memory known in the art.

The input device 1150 may receive an input from a user through a typical input scheme using a keyboard and a mouse and a new input scheme such as a touch input, a voice input, and an image input. For example, the input device 1150 may include another device capable of detecting an input from a keyboard, a mouse, a touchscreen, a microphone, or a user, and transferring the detected input to the electronic device 1100.

The output device 1160 may provide an output of the electronic device 1100 to the user through a visual, auditory, or tactile channel. For example, the output device 1160 may include, for example, a display, a touchscreen, a speaker, a vibration generator, or other devices capable of providing the output to the user. The network interface 1170 may communicate with an external device over a wired or wireless network.

The image correspondence apparatuses, apparatuses, processors, memories, electronic devices, cameras, storage devices, input devices, output devices, network interfaces, communication buses, image correspondence apparatus 100, apparatus 900, processor 910, memory 920, electronic device 1100, processor 1110, memory 1120, camera 1130, storage device 1140, input device 1150, output device 1160, network interface 1170, communication bus 1180, units, modules, devices, and other components described herein with respect to FIGS. 1-11 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIM D) multiprocessing, multiple-instruction single-data (MISD) multiprocessing, and multiple-instruction multiple-data (MIMD) multiprocessing.

The methods illustrated in FIGS. 1-11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method with image correspondence, comprising:
   acquiring a plurality of feature map pairs corresponding to outputs of a plurality of layers of a convolutional neural network (CNN) in response to an input of an input image pair;
   selecting a portion of feature map pairs from among the plurality of feature map pairs by determining, for each of the plurality of feature map pairs, whether to select the feature map pair based on a feature of the feature map pair;
   generating a hyper feature map pair based on the selected portion of feature map pairs; and
   generating a correspondence result of the input image pair based on a correlation of the hyper feature map pair.

2. The method of claim 1, wherein
   the plurality of layers of the CNN comprises one or more intermediate layers of the CNN, and
   the plurality of feature map pairs comprises one or more intermediate feature map pairs output from the one or more intermediate layers of the CNN.

3. The method of claim 1, wherein the acquiring of the plurality of feature map pairs comprises:
   acquiring first feature maps output from the plurality of layers of the CNN by inputting a first input image of the input image pair to the CNN;
   acquiring second feature maps output from the plurality of layers of the CNN by inputting a second input image of the input image pair to the CNN; and
   determining the plurality of feature map pairs by pairing the first feature maps and the second feature maps according to the plurality of layers of the CNN.

4. The method of claim 1, wherein the selecting of the portion of feature map pairs comprises dynamically selecting the portion of feature map pairs from among the plurality of feature map pairs based on outputs of one or more neural networks determined based on each of the plurality of feature map pairs.

5. The method of claim 4, wherein the one or more neural networks comprise:
   a first neural network configured to, for each of the plurality of feature map pairs, encode a channel-wise feature vector corresponding to the feature map pair to a relevance vector; and
   a second neural network configured to, for each of the plurality of feature map pairs, transform the feature map pair to another feature map pair by reducing a channel-wise dimension of the feature map pair.

6. The method of claim 4, wherein the one or more neural networks are trained to select the portion of feature map pairs from among the plurality of feature map pairs based on a selection ratio determined by a configuration parameter.

7. The method of claim 1, wherein the selecting of the portion of feature map pairs comprises:
   determining a first feature vector corresponding to a first feature map pair among the plurality of feature map pairs;
   acquiring a first relevance vector corresponding to an output of a multi-layer perceptron in response to an input of the first feature vector; and
   determining whether to select the first feature map pair based on a value of the first relevance vector.

8. The method of claim 1, wherein the selecting of the portion of feature map pairs comprises selecting the portion of feature map pairs from among the plurality of feature map pairs by processing each of the plurality of feature map pairs in parallel to consider the feature of each of the plurality of feature map pairs.

9. The method of claim 1, wherein the selecting of the portion of feature map pairs comprises selecting the portion of feature map pairs from among the plurality of feature map pairs based on a selection ratio determined by a configuration parameter.

10. The method of claim 9, wherein the configuration parameter is determined based on either one or both of a speed and an accuracy of an application.

11. The method of claim 1, wherein the generating of the hyper feature map pair comprises generating the hyper feature map pair by performing upsampling and concatenation based on the selected portion of feature map pairs.

12. The method of claim 1, wherein the generating of the hyper feature map pair comprises generating the hyper feature map pair by combining other feature map pairs corresponding to the selected portion of feature map pairs.

13. A non-transitory computer-readable record medium storing instructions that, when executed by a processor, configure the processor to perform the method of claim 1.

14. An apparatus with image correspondence, comprising:
a processor configured to
acquire a plurality of feature map pairs corresponding to outputs of a plurality of layers of a convolutional neural network (CNN) in response to an input of an input image pair,
select a portion of feature map pairs from among the plurality of feature map pairs by determining, for each of the plurality of feature map pairs, whether to select the feature map pair based on a feature of the feature map pair,
generate a hyper feature map pair based on the selected portion of feature map pairs, and
generate a correspondence result of the input image pair based on a correlation of the hyper feature map pair.

15. The apparatus of claim 14, wherein the plurality of layers of the CNN comprises one or more intermediate layers of the CNN, and
the plurality of feature map pairs comprises one or more intermediate feature map pairs output from the one or more intermediate layers of the CNN.

16. The apparatus of claim 14, wherein, for the determining of the portion of feature map pairs, the processor is configured to dynamically select the portion of feature map pairs from among the plurality of feature map pairs based on outputs of one or more neural networks determined based on each of the plurality of feature map pairs.

17. The apparatus of claim 14, wherein, for the determining of the portion of feature map pairs, the processor is configured to select the portion of feature map pairs from among the plurality of feature map pairs based on a selection ratio determined by a configuration parameter.

18. The apparatus of claim 14, further comprising a memory storing instructions that, when executed by the processor, configure the processor to perform the acquiring of the plurality of feature map pairs, the determining of the portion of feature map pairs, the generating of the hyper feature map pair, and the generating of the correspondence result.

19. The apparatus of claim 18, wherein the apparatus is an electronic device comprising a camera configured to generate one or more input images of the input image pair.

20. An electronic device comprising:
a camera configured to generate one or more input images of an input image pair; and
a processor configured to
acquire a plurality of feature map pairs corresponding to outputs of a plurality of layers of a convolutional neural network (CNN) in response to an input of the input image pair,
select a portion of feature map pairs from among the plurality of feature map pairs by determining, for each of the plurality of feature map pairs, whether to select the feature map pair based on a feature of the feature map pair,
generate a hyper feature map pair based on the selected portion of feature map pairs, and
generate a correspondence result of the input image pair based on a correlation of the hyper feature map pair.

21. The device of claim 20, wherein
the plurality of layers of the CNN comprises one or more intermediate layers of the CNN, and
the plurality of feature map pairs comprises one or more intermediate feature map pairs output from the one or more intermediate layers of the CNN.

22. The device of claim 20, wherein, for the determining of the portion of feature map pairs, the processor is configured to dynamically select the portion of feature map pairs from among the plurality of feature map pairs based on outputs of one or more neural networks determined based on each of the plurality of feature map pairs.

23. A method with image correspondence, comprising:
determining, using one or more neural networks, relevance vectors of feature map pairs output from intermediate convolutional neural network (CNN) layers, wherein the feature map pairs are generated based on an image pair;
dynamically selecting, based on the relevance vectors, a portion of the feature map pairs for generating a hyper feature map pair by determining, for each of the plurality of feature map pairs, whether to select the feature map pair based on one of the relevance vectors determined for the feature map pair; and
generating a correspondence result of the image pair based on a correlation of the hyper feature map pair.

24. The method of claim 23, wherein the dynamically selecting comprises determining whether to select or skip a feature map pair of the feature map pairs for the generating of the hyper feature map pair, based on a value of the one of the relevance vectors determined for the feature map pair.

25. The method of claim 23, wherein each of the feature map pairs are output from a different one of the intermediate CNN layers, and each of the feature map pairs include a feature map corresponding to a first image of the image pair and a feature map corresponding to a second image of the image pair.

26. The method of claim 23, further comprising determining a semantic correspondence between an object in a first image of the image pair and a target object in a second image of the image pair based on the correspondence result.

* * * * *